US010215232B2

(12) United States Patent
James et al.

(10) Patent No.: US 10,215,232 B2
(45) Date of Patent: Feb. 26, 2019

(54) BEARING WITH NON-UNIFORM CAGE CLEARANCE

(71) Applicant: UNITED TECHNOLOGIES CORPORATION, Farmington, CT (US)

(72) Inventors: Reade W. James, West Hartford, CT (US); Kevin M. Duffy, Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/589,036

(22) Filed: May 8, 2017

(65) Prior Publication Data

US 2018/0320741 A1 Nov. 8, 2018

(51) Int. Cl.
*F16C 33/58* (2006.01)
*F16C 33/38* (2006.01)
*F16C 19/22* (2006.01)
*F16C 19/02* (2006.01)
*F16C 33/46* (2006.01)
*F16C 33/66* (2006.01)
(Continued)

(52) U.S. Cl.
CPC .......... *F16C 33/3887* (2013.01); *F16C 17/18* (2013.01); *F16C 19/02* (2013.01); *F16C 19/22* (2013.01); *F16C 33/3806* (2013.01); *F16C 33/467* (2013.01); *F16C 33/583* (2013.01); *F16C 33/585* (2013.01); *F16C 33/6681* (2013.01); *F16C 17/02* (2013.01);
(Continued)

(58) Field of Classification Search
CPC .............. F16C 33/3806; F16C 33/4605; F16C 2360/23; F16C 33/58; F16C 33/583
See application file for complete search history.

(56) References Cited

U.S. PATENT DOCUMENTS 2,983,560 A * 5/1961 Pitner ..................... F16C 19/26
29/898.063
3,219,399 A * 11/1965 Smith ..................... F16C 19/26
384/581
(Continued)

FOREIGN PATENT DOCUMENTS

DE 1042305 B * 10/1958 .............. F16C 19/00
DE 239026 9/1986
(Continued)

OTHER PUBLICATIONS

European Patent Office, European Search Report dated Oct. 10, 2018 in Application No. 18170396.8-1013.

*Primary Examiner* — Phillip A Johnson
(74) *Attorney, Agent, or Firm* — Snell & Wilmer L.L.P.

(57) ABSTRACT

A bearing with non-uniform cage clearance is provided. The bearing may comprise an inner ring having a first inner ring surface radially opposite a second inner ring surface; bearing elements in contact with the first inner ring surface; an outer bearing ring surrounding the inner bearing ring and the bearing elements; and a bearing cage having a first bearing cage surface radially opposite a second bearing cage surface and configured to surround and retain the bearing elements. At least one of the first inner ring surface, the first bearing cage surface, the second bearing cage surface, or a second outer ring surface of the outer ring may comprise an out of round shape having one or more peaks and one or more valleys relative to a radial centerpoint of the bearing.

18 Claims, 10 Drawing Sheets

(51) Int. Cl.
 *F16C 17/18* (2006.01)
 *F16C 17/02* (2006.01)
 *F16C 33/10* (2006.01)
 *F16C 33/64* (2006.01)

(52) U.S. Cl.
 CPC ...... *F16C 33/1075* (2013.01); *F16C 33/4605* (2013.01); *F16C 33/64* (2013.01); *F16C 2360/23* (2013.01)

(56) References Cited

U.S. PATENT DOCUMENTS

| | | | |
|---|---|---|---|
| 3,832,023 A * | 8/1974 | Fairbank | F16C 33/3806 384/527 |
| 8,562,224 B2 * | 10/2013 | Duffy | F16C 33/6677 384/475 |
| 9,062,709 B2 | 6/2015 | Lemaitre et al. | |
| 2003/0021504 A1 * | 1/2003 | Tibbits | F16C 33/58 384/513 |
| 2014/0010647 A1 | 1/2014 | Nishida | |

FOREIGN PATENT DOCUMENTS

| | | | | |
|---|---|---|---|---|
| DE | 102011014078 | | 1/2012 | |
| DE | 102012016983 | | 3/2014 | |
| DE | 102009019677 B4 * | | 1/2018 | |
| EP | 2080920 A2 * | | 7/2009 | ............. F16C 25/08 |
| GB | 948480 A * | | 2/1964 | ............. F16C 19/26 |
| JP | 2006329313 A * | | 12/2006 | ............. F16C 17/028 |
| JP | 2008240778 | | 10/2008 | |

* cited by examiner

BEARING WITH NON-UNIFORM CAGE CLEARANCE

FIELD

The present disclosure relates generally to gas turbine engines, and more specifically, to bearings for gas turbine engines.

BACKGROUND

Gas turbine engines typically comprise employ which support rotating shafts. The bearings may comprise an inner ring which rotates with the shaft, an outer ring which does not rotate, a plurality of bearing elements between the inner ring and the outer ring, and a bearing cage in contact with the inner ring or the outer ring and configured to separate and retain the bearing elements. The bearing cage typically comprises an annular geometry and is concentric with the inner ring and/or the outer ring. During engine operation, the rotating shaft may whirl and deflect from the engine centerline. Displacement of the rotating shaft is typically at a different frequency than the rotation of the bearing cage, which may cause the bearing cage to destabilize and become unstable relative to the inner ring or the outer ring. Instability in the bearing cage may increase undesirable wear in the bearing and/or the bearing cage, and may lead to fracturing of the bearing cage.

SUMMARY

In various embodiments, a bearing is disclosed. The bearing may comprise an inner ring having a first inner ring surface radially opposite a second inner ring surface. The bearing may comprise a bearing cage having a first bearing cage surface radially opposite a second bearing cage surface. The second bearing cage surface may be configured to engage with the first inner ring surface. At least one of the first inner ring surface or the second bearing cage surface may comprise an out of round shape having a peak and a valley relative to a radial centerpoint of the bearing.

In various embodiments, in response to the second bearing cage surface being out of round, the second bearing cage surface proximate the valley may be a first distance from the first inner ring surface and the second bearing cage surface proximate the peak may be a second distance from the first inner ring surface. The second distance may be greater than the first distance. In various embodiments, in response to the first inner ring surface being out of round, the first inner ring surface proximate the peak may be a first distance from the second bearing cage surface and the first inner ring surface proximate the valley may be a second distance from the second bearing cage surface. The second distance may be greater than the first distance. The peak may comprise between 2 peaks to 10 peaks and the valley may comprise between 2 valleys to 10 valleys. The bearing may further comprise a bearing element in contact with the first inner ring surface of the inner ring and surrounded by the bearing cage, and an outer ring in contact with the bearing element radially opposite the inner ring.

In various embodiments, a gas turbine engine is disclosed. The gas turbine engine may comprise a shaft; an inner bearing ring coupled to the shaft; a plurality of bearing elements in contact with a first inner ring surface of the inner bearing ring; an outer bearing ring surrounding the inner bearing ring and the bearing elements, wherein the shaft and the inner bearing ring are configured to rotate within the outer bearing ring; and a bearing cage having a first bearing cage surface radially opposite a second bearing cage surface, wherein the bearing cage is configured to surround the bearing elements and engage with at least one of the inner bearing ring or the outer bearing ring. At least one of the first inner ring surface, the first bearing cage surface, the second bearing cage surface, or a second outer ring surface of the outer bearing ring may comprise an out of round shape having a peak and a valley relative to a radial centerpoint between the inner bearing ring and the outer bearing ring.

In various embodiments, in response to the bearing cage engaging the inner bearing ring and the second bearing cage surface being out of round, the second bearing cage surface proximate the valley may be a first distance from the first inner ring surface and the second bearing cage surface proximate the peak may be a second distance from the first inner ring surface. In various embodiments, in response to the bearing cage engaging the inner bearing ring and the first inner ring surface being out of round, the first inner ring surface proximate the peak may be a first distance from the second bearing cage surface and the first inner ring surface proximate the valley may be a second distance from the second bearing cage surface. In various embodiments, in response to the bearing cage engaging the outer bearing ring and the first bearing cage surface being out of round, the first bearing cage surface proximate the peak may be a first distance from the second outer ring surface and the first bearing cage surface proximate the valley may be a second distance from the second outer ring surface. In various embodiments, in response to the bearing cage engaging the outer bearing ring and the second outer ring surface being out of round, the second outer ring surface proximate the valley may be a first distance from the first bearing cage surface and the second outer ring surface proximate the peak may be a second distance from the first bearing cage surface. The peak may comprise between 2 peaks to 10 peaks and the valley may comprise between 2 valleys to 10 valleys.

In various embodiments, a bearing is disclosed. The bearing may comprise an outer ring having a first outer ring surface radially opposite a second outer ring surface; and a bearing cage having a first bearing cage surface radially opposite a second bearing cage surface, wherein the first bearing cage surface is configured to engage with the second outer ring surface, and wherein at least one of the second outer ring surface or the first bearing cage surface comprise an out of round shape having a peak and a valley relative to a radial centerpoint of the bearing.

In various embodiments, in response to the first bearing cage surface being out of round, the first bearing cage surface proximate the peak may be a first distance from the second outer ring surface and the first bearing cage surface proximate the valley may be a second distance from the second outer ring surface. The second distance may be greater than the first distance. In various embodiments, in response to the second outer ring surface being out of round, the second outer ring surface proximate the valley may be a first distance from the first bearing cage surface and the second outer ring surface proximate the peak may be a second distance from the first bearing cage surface. The second distance may be greater than the first distance. The peak may comprise between 2 peaks to 10 peaks and the valley may comprise between 2 valleys to 10 valleys. The bearing may further comprise a bearing element in contact with the second outer ring surface of the outer ring and surrounded by the bearing cage, and an inner ring in contact with the bearing element radially opposite the outer ring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
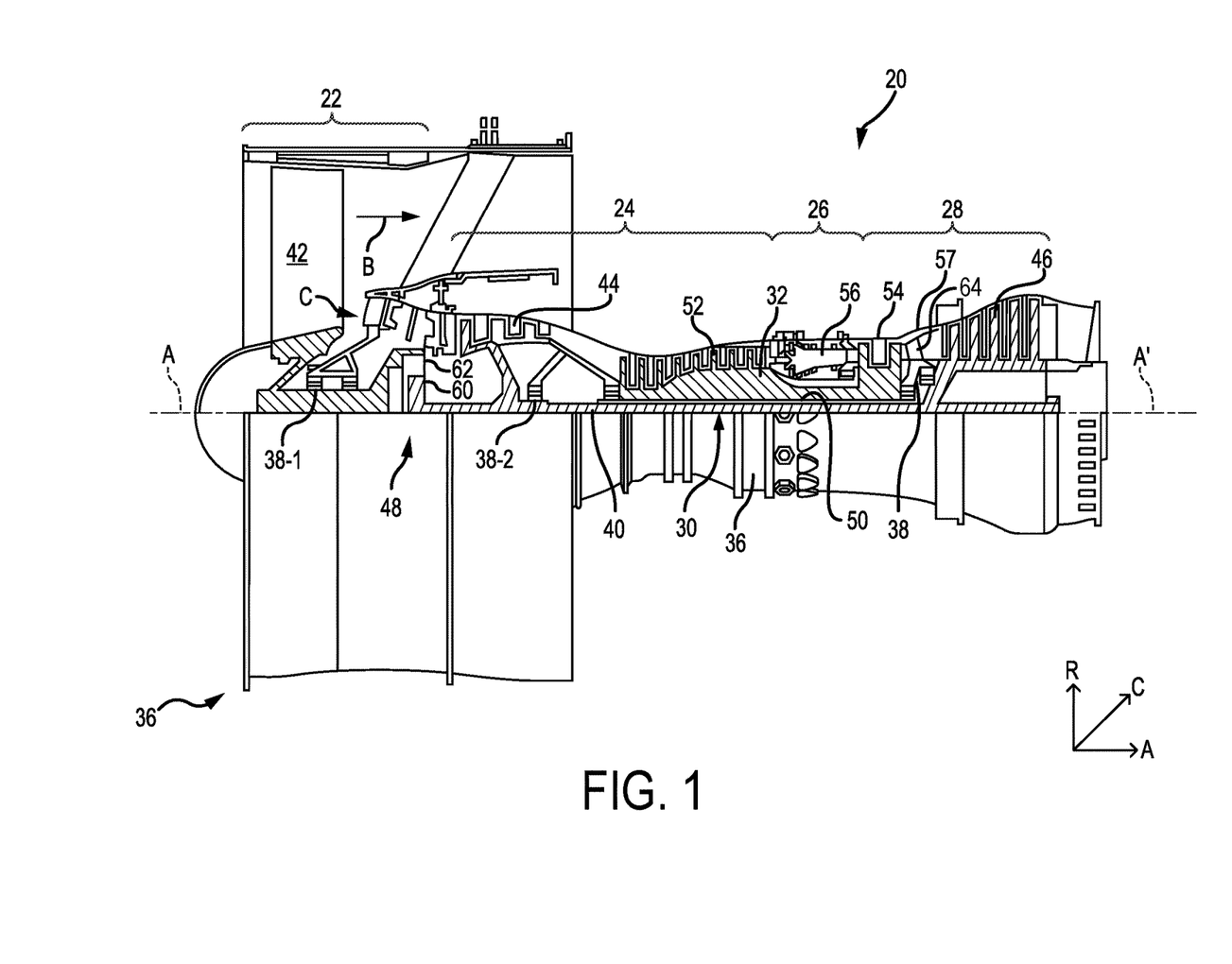
FIG. 1 illustrates a cross-section view of an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive working fluid (e.g., air) along a bypass flow-path B, while compressor section 24 may further drive working fluid along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing compartment 38 (shown as, for example, bearing compartment 38-1 and bearing compartment 38-2 in FIG. 1). It should be understood that various bearing compartment 38 at various locations may alternatively or additionally be provided, including, for example, bearing compartment 38, bearing compartment 38-1, and/or bearing compartment 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing compartments 38 in turbine section 28. Inner shaft 40 and outer shaft 50 may be concentric and may rotate via bearing compartments 38 about engine central longitudinal axis A-A'. As used herein, a "high pressure" compressor and/or turbine may experience a higher pressure than a corresponding "low pressure" compressor and/or turbine.

In various embodiments, the working fluid along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 64 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
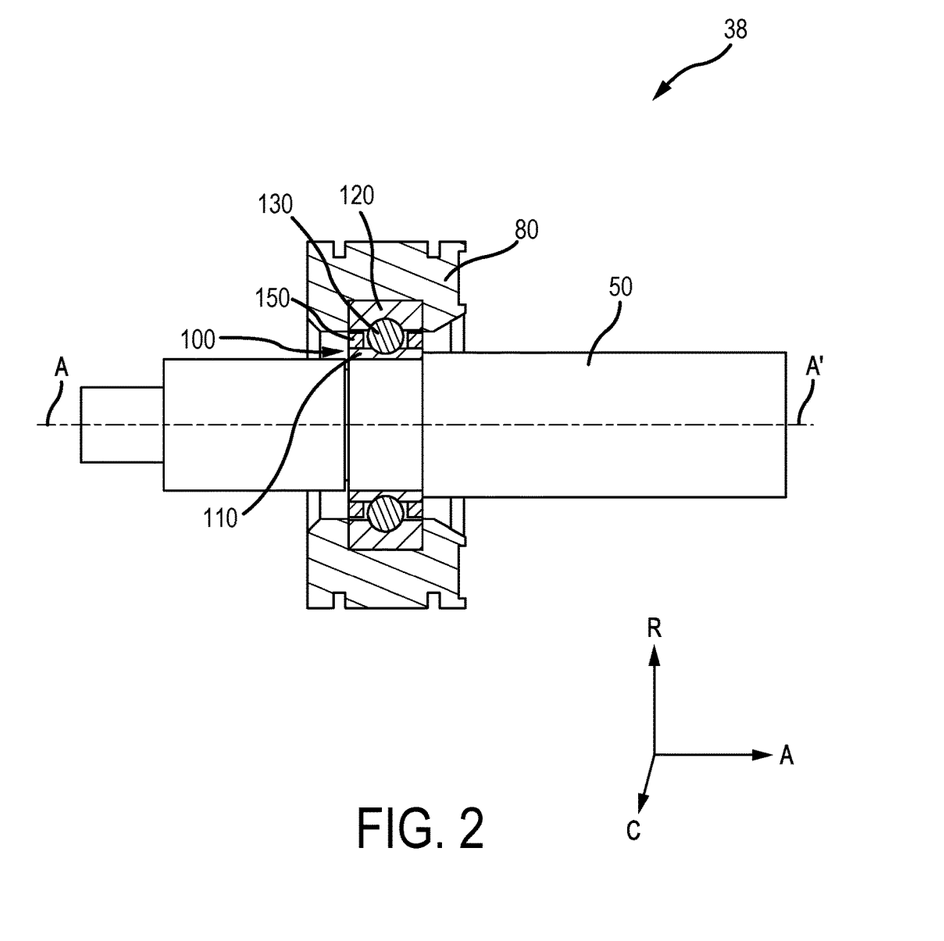
FIG. 2 illustrates a cross-section view of a bearing compartment for the exemplary gas turbine engine of FIG. 1, in accordance with various embodiments.

In various embodiments, and with reference to FIG. 2, a bearing compartment 38 of gas turbine engine 10 is illustrated in greater detail. Bearing compartment 38 may comprise any bearing compartment discussed herein, such as, for example, a bearing compartment 38 in turbine section 28. Although a gas turbine engine is used for exemplary purposes, bearing compartments of the present disclosure may be used in various embodiments in any suitable device or apparatus having a bearing compartment. Bearing compartment 38 may include an outer shaft 50 configured to rotate about engine central longitudinal axis A-A'. Outer shaft 50 may engage an inner ring 110 of a bearing 100 which also rotates about engine central longitudinal axis A-A'. Bearing 100 may be defined by inner ring 110 (e.g., an inner bearing ring), an outer ring 120 (e.g., an outer bearing ring), and a plurality of bearing elements 130 (e.g., spherical balls, cylindrical rollers, and/or the like) disposed between outer ring 120 and inner ring 110. Outer ring 120 may be rotationally stationary about engine central longitudinal axis A-A'. In that regard, inner ring 110 rotates while outer ring 120 remains stationary. Bearing elements 130 may rotate and decrease friction between inner ring 110 and outer ring 120 as inner ring 110 rotates relative to outer ring 120. Inner ring 110 and/or outer ring 120 may comprise an annular geometry. Bearing compartment 38 may also include a bearing support structure 80 coupled to outer ring 120. Bearing support structure 80, along with other static components of bearing compartment 38 and/or gas turbine engine 10, may be configured to retain bearing 100 in the radial and/or axial directions.

Figure 3:
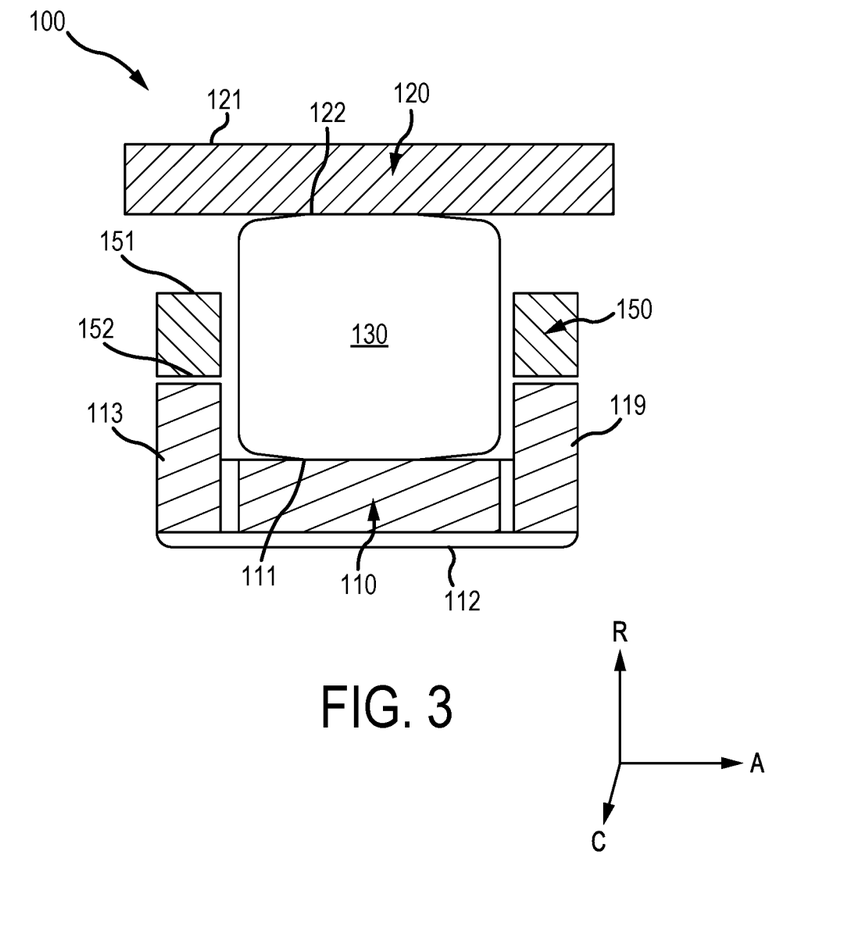
FIG. 3 illustrates a cross-section view of a bearing, in accordance with various embodiments.

In various embodiments, and with reference to FIG. 3, bearing 100 is depicted in greater detail. Inner ring 110 may comprise a first inner ring surface 111 radially opposite a second inner ring surface 112. First inner ring surface 111 may be configured to engage bearing element 130. Inner ring 110 may also comprise a forward shoulder 113 axially opposite an aft shoulder 119. Each shoulder 113, 119 may extend radially from first inner ring surface 111 in a direction towards outer ring 120, and may be configured to engage bearing element 130 at opposite axially outer surfaces (e.g., forward shoulder 113 engages a forward axially outer surface of bearing element 130 and aft shoulder 119 engages an aft axially outer surface of bearing element 130). Outer ring 120 may comprise a first outer ring surface 121 radially opposite a second outer ring surface 122. Second outer ring surface 122 may be configured to engage bearing element 130. Bearing 100 may also include a bearing cage 150 configured to retain bearing elements 130 and separate each bearing element 130 in the circumferential direction. Bearing cage 150 may comprise an annular geometry and may be concentric with inner ring 110 and/or outer ring 120. Bearing cage 150 may comprise a first bearing cage surface 151 radially opposite a second bearing cage surface 152. Second bearing cage surface 152 may be configured to engage first inner ring surface 111. For example, bearing cage 150 may be configured to at least partially contact a forward shoulder 113 and/or an aft shoulder 119 of inner ring 110.

In various embodiments, bearing 100 may comprise a non-uniform bearing cage clearance. For example, at least one of inner ring 110, outer ring 120, and/or bearing cage 150 may comprise an out of round shape. As discussed herein, an out of round shape may refer to inner ring 110, outer ring 120 and/or bearing cage 150 having an inner surface (a first surface) or an outer surface (a second surface) that is non-circular (e.g., second bearing cage surface 452). For example, and with brief reference to FIGS. 4A-4D, an out of round shape may be sinusoidal in the radial direction, and/or any other suitable shape. The out of round shape may include one or more peaks (e.g., peak 455) and one or more valleys (e.g., valley 457) relative to a radial centerpoint 401. In that respect, a peak as discussed herein may define a portion of the out of round shape that extends further radially outward compared to a circular shape. For example, each peak may define a portion of the out of round shape that is extended at a second distance (e.g., second distance d2) from radial centerpoint 401. A valley as discussed herein may define a portion of the out of round shape that extends further radially inward compared to a circular shape. For example, each valley may define a position of the out of round shape that is extended at a first distance (e.g., first distance d1) from radial centerpoint 401, wherein the first distance is less than the second distance. In that respect, each valley may comprise a portion of the out of round shape having a smaller clearance relative to a nearby surface (e.g., creating a "pinch point"), compared to each peak. The portions of the out of round shape between each respective peak and valley may comprise a substantially round circular shape.

For example, and with reference to FIGS. 4A-4D, a bearing 400 having an out of round bearing cage 450 with one or more pinch points relative to inner ring 110 is depicted in accordance with various embodiments. Out of round bearing cage 450 may comprise a second bearing cage surface 452 having an out of round shape. In various embodiments, first bearing cage surface 451 may be circular relative to second bearing cage surface 452. In various embodiments, first bearing cage surface 451 may also comprise an out of round shape at least partially similar to second bearing cage surface 452.

Out of round bearing cage 450 may comprise a second bearing cage surface 452 having one or more valleys 457 and one or more peaks 455. Each valley 457 may define a portion of second bearing cage surface 452 that extends further radially inward, relative to radial centerpoint 401, in comparison to a standard circular shape. Each peak 455 may define a portion of second bearing cage surface 452 that extends further radially outward, relative to radial centerpoint 401, in comparison to a standard circular shape. Each valley 457 may define a pinch point relative to first inner ring surface 111 of inner ring 110. For example, each valley 457 may be distanced from first inner ring surface 111 at a first distance d1. Each peak 455 may be distanced from first inner ring surface 111 at a second distance d2. Second distance d2 may be greater than first distance d1. The reduced clearances (e.g., first distance d1) at each pinch point may result in a reduction of bearing cage eccentric mass during engine operation. With the mass center of out of round bearing cage 450 closer to the geometric center of rotation of bearing 400, a bearing cage unbalance force may be at least partially reduced, thus lowering the stress in out of round bearing cage 450 during engine operation.

In various embodiments, a clearance at each valley 457 relative to inner ring 110 may be further minimized. In various embodiments, the clearance at each pinch point (e.g., distance d2) may be close to zero without causing out of round bearing cage 450, or other components of bearing 400, to seize. For example, in response to thermal conditions causing out of round bearing cage 450 to contact inner ring 110, out of round bearing cage 450' may deflect towards its nominal diameter rather than seizing.

Figure 4A:
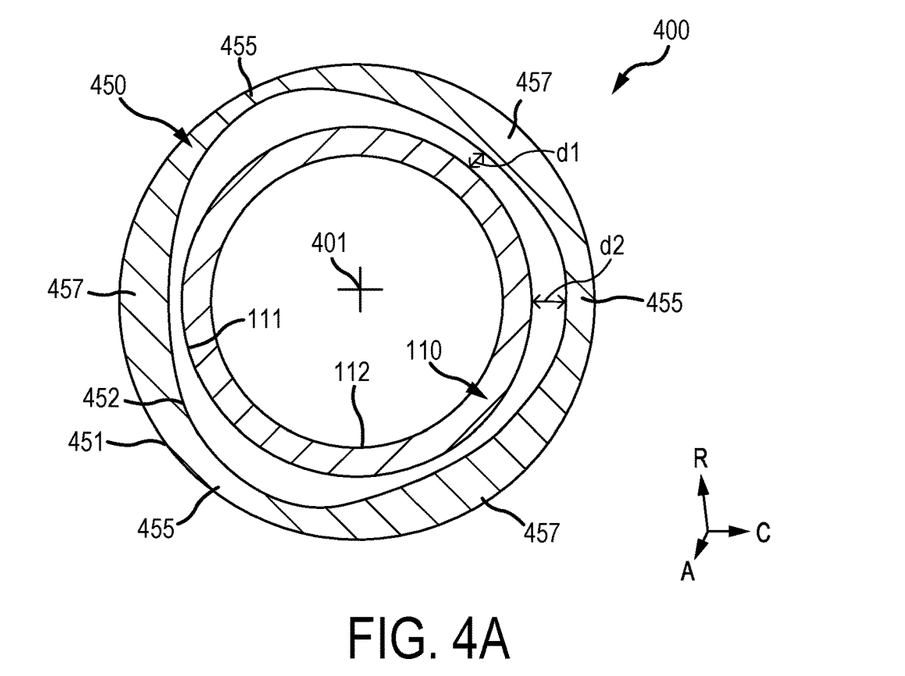
FIGS. 4A, 4B, 4C, and 4D illustrate a cross-section view of a bearing having an out of round bearing cage with various pinch points, in accordance with various embodiments.
Figure 4B:
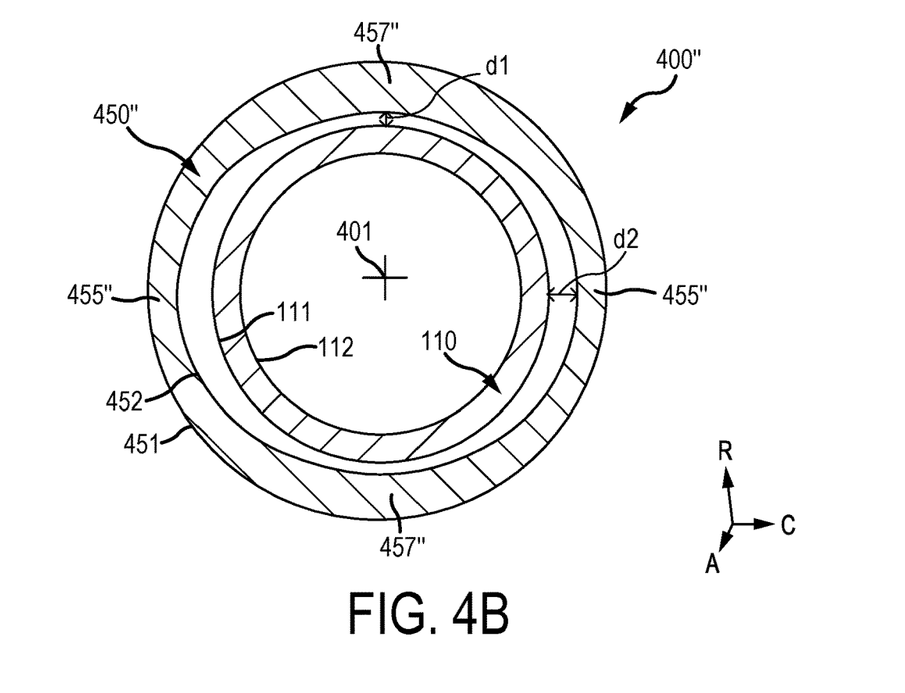
Figure 4C:
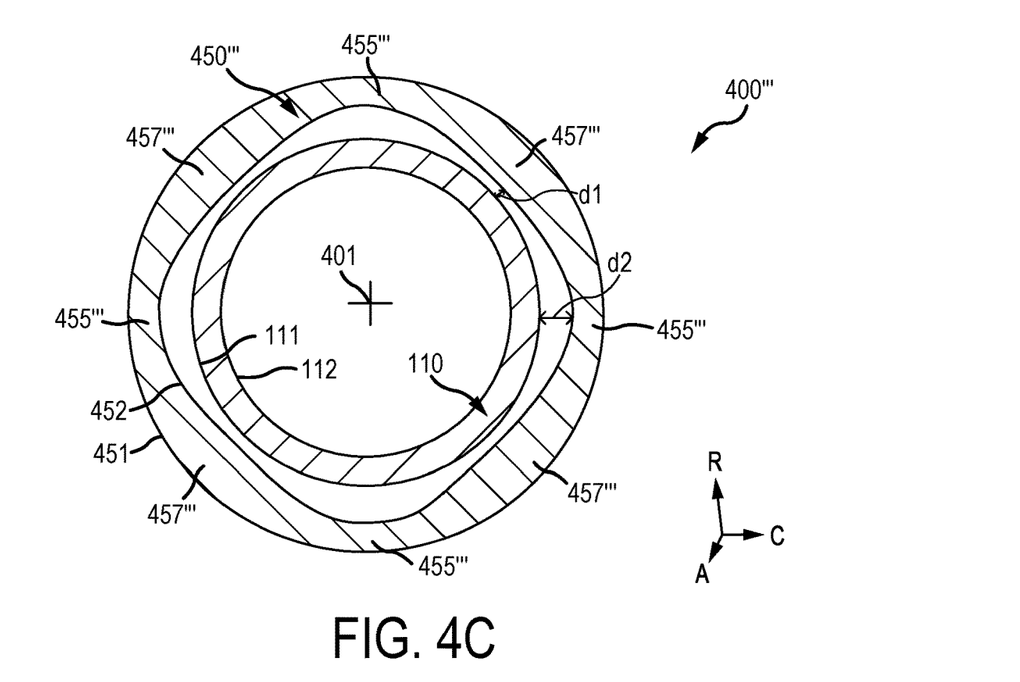
Figure 4D:
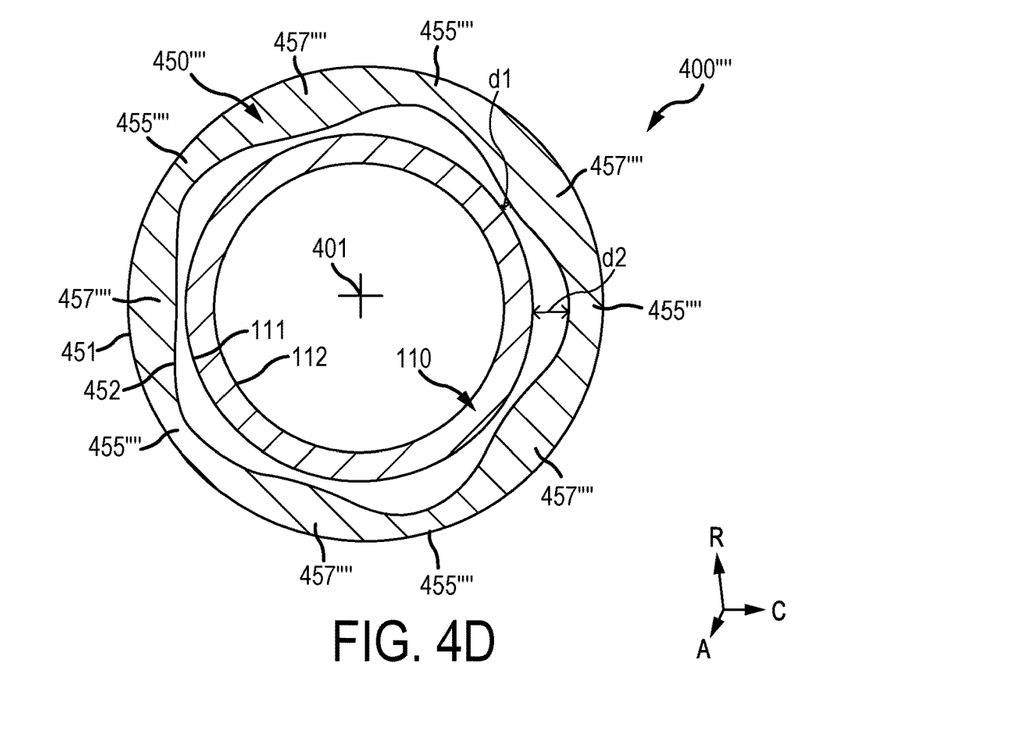

In various embodiments, bearing 400 may comprise any suitable number of pinch points, valleys 457, and/or peaks 455. For example, second bearing cage surface 452 may comprise between 2 peaks to 10 peaks 555, between 2 valleys to 10 valleys 557, and/or between 2 corresponding pinch points to 10 corresponding pinch points. For example, and with reference to FIG. 4A, bearing 400 may include an out of round bearing cage 450 having a second bearing cage surface 452 comprising three valleys 457 and three peaks 455, thus creating three pinch points relative to inner ring 110. With reference to FIG. 4B, and in accordance with various embodiments, bearing 400" may include an out of round bearing cage 450" having a second bearing cage surface 452" comprising two valleys 457" and two peaks 455", thus creating two pinch points relative to inner ring 110. With reference to FIG. 4C, and in accordance with various embodiments, bearing 400''' may include an out of round bearing cage 450''' having a second bearing cage surface 452''' comprising four valleys 457''' and four peaks 455''', thus creating four pinch points relative to inner ring 110. With reference to FIG. 4D, and in accordance with various embodiments, bearing 400'''' may include an out of round bearing cage 450'''' having a second bearing cage surface 452'''' comprising five valleys 457'''' and five peaks 455'''', creating five pinch points relative to inner ring 110.

As a further example, and with reference to FIGS. 5A-5D, a bearing 500 having an out of round inner ring 510 with one or more pinch points relative to bearing cage 150 is depicted in accordance with various embodiments. Out of round inner ring 510 may comprise a first inner ring surface 511 having an out of round shape. In various embodiments, a second inner ring surface 512 may be circular relative to first inner ring surface 511. In various embodiments, second inner ring surface 512 may also comprise an out of round shape at least partially similar to first inner ring surface 511.

Out of round inner ring 510 may comprise a first inner ring surface 511 having one or more valleys 517 and one or more peaks 515. Each valley 517 may define a portion of first inner ring surface 511 that extends further radially inward, relative to a radial centerpoint 501, in comparison to a standard circular shape. Each peak 515 may define a portion of first inner ring surface 511 that extends further radially outward, relative to radial centerpoint 501, in comparison to a standard circular shape. Each peak 515 may define a pinch point relative to second bearing cage surface 152 of bearing cage 150. For example, each peak 515 may be distanced from second bearing cage surface 152 at a first distance d1. Each valley 517 may be distanced from second bearing cage surface 152 at a second distance d2. Second distance d2 may be greater than first distance d1. The reduced clearances (e.g., first distance d1) at each pinch point may result in a reduction of bearing cage eccentric mass during engine operation. With the mass center of bearing cage 150 closer to the geometric center of rotation of bearing 500, a bearing cage unbalance force may be at least partially reduced, thus lowering the stress in bearing cage 150 during engine operation.

In various embodiments, the clearance at each peak 515 relative bearing cage 150 may be further minimized. The clearance at each pinch point (e.g., distance d2) may be close to zero without causing bearing cage 150 to seize. For example, in response to thermal conditions causing bearing cage 150 to contact out of round inner ring 510', out of round inner ring 510' may deflect towards its nominal diameter to at least partially reduce the stress in bearing cage 150.

Figure 5A:
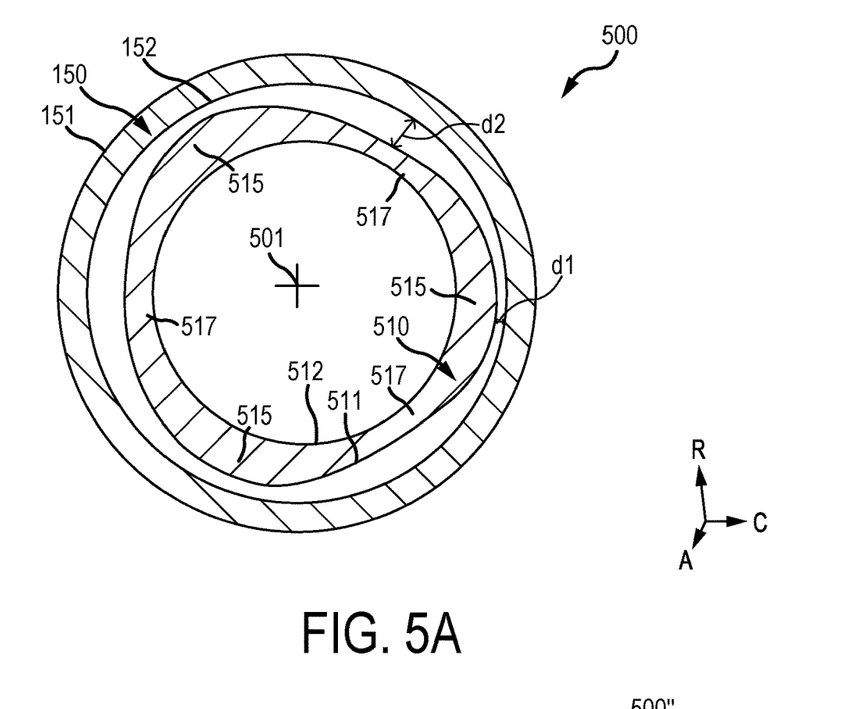
FIGS. 5A, 5B, 5C, and 5D illustrate a cross-section view of a bearing having an out of round inner ring with various pinch points, in accordance with various embodiments.
Figure 5B:
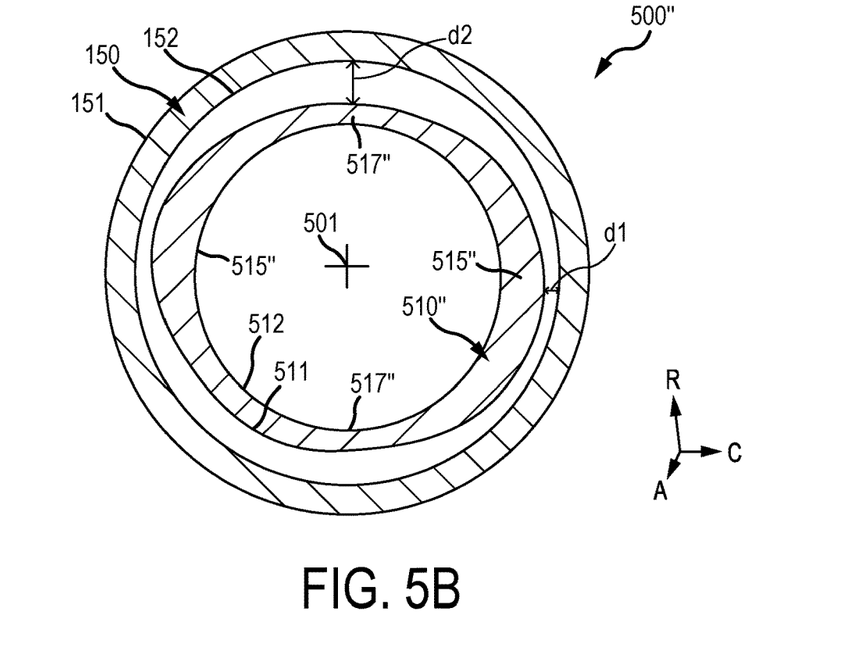
Figure 5C:
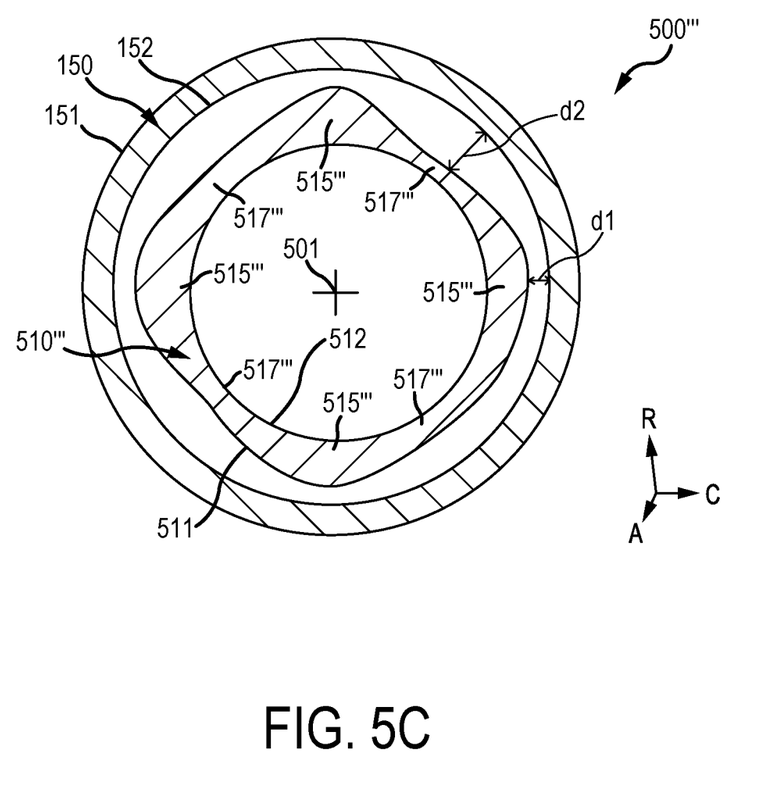
Figure 5D:
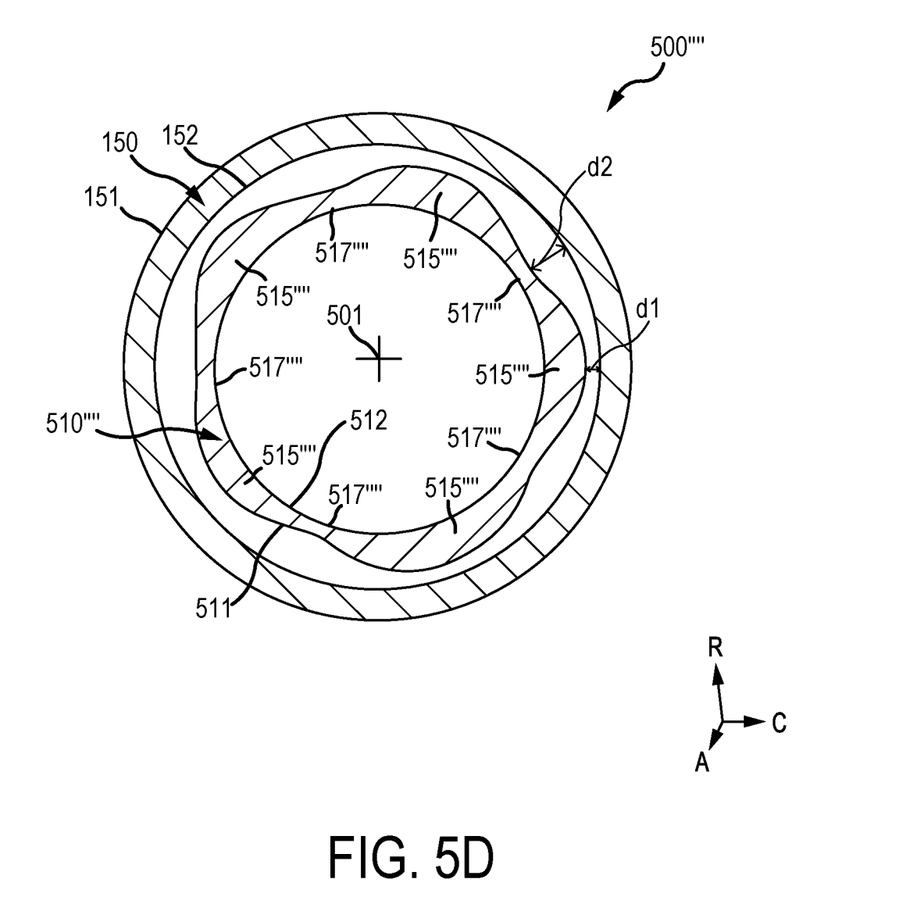

In various embodiments, bearing 500 may comprise any suitable number of pinch points, valleys 517, and/or peaks 515. For example, bearing 500 may comprise between 2 peaks to 10 peaks 515, between 2 valleys to 10 valleys 517, and/or between 2 corresponding pinch points to 10 corresponding pinch points. For example, and with reference to FIG. 5A, bearing 500 may include an out of round inner ring 510 having a first inner ring surface 511' comprising three valleys 517 and three peaks 515, thus creating three pinch points relative to bearing cage 150. With reference to FIG. 5B, and in accordance with various embodiments, bearing 500" may include an out of round inner ring 510" having a first inner ring surface 511" comprising two valleys 517" and two peaks 515", thus creating two pinch points relative to bearing cage 150. With reference to FIG. 5C, and in accordance with various embodiments, bearing 500''' may include an out of round inner ring 510''' having a first inner ring surface 511''' comprising four valleys 517''' and four peaks 515''', thus creating four pinch points relative bearing cage 150. With reference to FIG. 5D, and in accordance with various embodiments, bearing 500"" may include an out of round inner ring 510"" having a first inner ring surface 511"" comprising five valleys 517"" and five peaks 515"", thus creating five pinch points relative to bearing cage 150.

Figure 6:
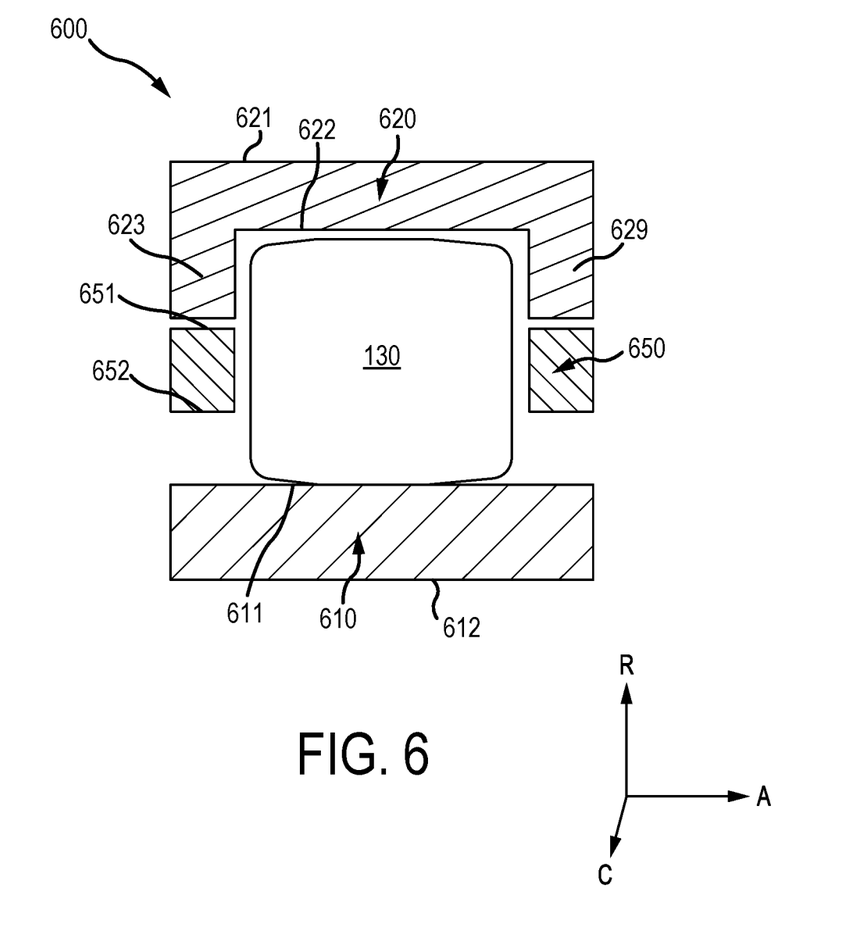
FIG. 6 illustrates a cross-section view of a bearing having a bearing cage coupled to an outer ring, in accordance with various embodiments.

In various embodiments, and with reference to FIG. 6, a bearing 600 may also comprise a bearing cage 650 engaged with an outer ring 620. In that respect, inner ring 610 may comprise a first inner ring surface 611 radially opposite a second inner ring surface 612. First inner ring surface 611 may be configured to engage bearing element 130. Outer ring 620 may comprise a first outer ring surface 621 radially opposite a second outer ring surface 622. Second outer ring surface 622 may be configured to engage bearing element 130. Outer ring 620 may also comprise a forward shoulder 623 axially opposite an aft shoulder 629. Each shoulder 623, 629 may extend radially from second outer ring surface 622 towards inner ring 610 and may be configured to engage each bearing element 130 at opposite axially outer surfaces (e.g., forward shoulder 623 engages a forward axially outer surface of bearing element 130 and aft shoulder 629 engages an aft axially outer surface of bearing element 130). Bearing 600 may also include a bearing cage 650 configured to retain bearing elements 130 and separate each bearing element 130 in the circumferential direction. Bearing cage 650 may comprise an annular geometry and may be concentric with inner ring 610 and/or outer ring 620. Bearing cage 650 may comprise a first bearing cage surface 651 radially opposite a second bearing cage surface 652. First bearing cage surface 651 may be configured to engage second outer ring surface 622. For example, bearing cage 650 may be configured to at least partially contact a forward shoulder 623 and/or an aft shoulder 629 of outer ring 620.

Figure 7:
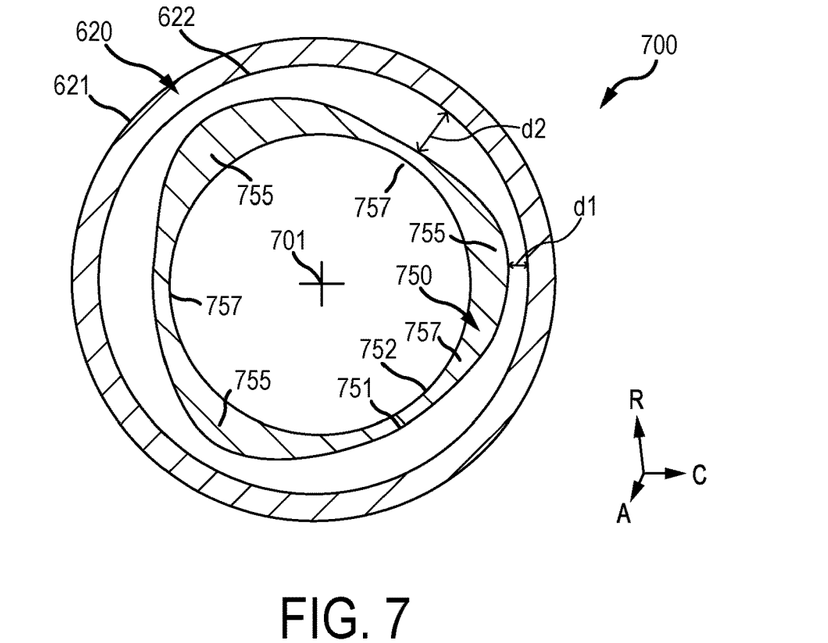
FIG. 7 illustrates a cross-section view of a bearing having an out of round bearing cage coupled to an outer ring, in accordance with various embodiments.
Figure 8:
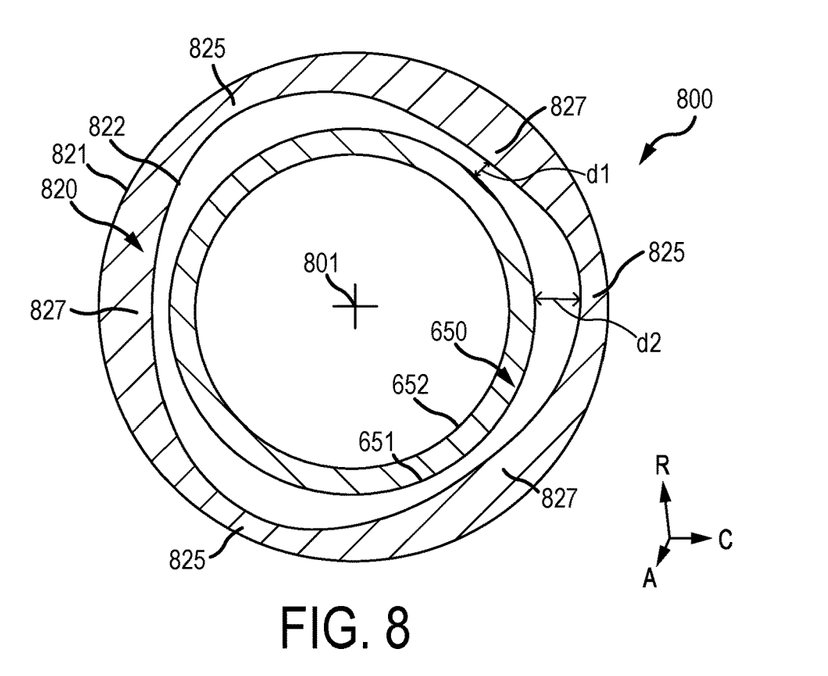
FIG. 8 illustrates a cross-section view of a bearing having a bearing cage coupled to an out of round outer ring, in accordance with various embodiments.

In various embodiments, at least one of outer ring 620 and/or bearing cage 650 may comprise an out of round shape, as described further herein. The out of round shape may include one or more peaks (e.g., peak 755) and one or more valleys (e.g., valley 757). Each peak may have a first distance from a radial centerpoint (e.g., radial centerpoint 701, 801) of outer ring 620 and/or bearing cage 650 that is greater than a second distance from each valley to the radial centerpoint (e.g., radial centerpoint 701, 801) of outer ring 620 and/or bearing cage 650, as discussed further herein. For example, each valley may comprise a portion of the out of round shape having a smaller clearance relative to a nearby surface (e.g., creating a "pinch point").

For example, and with reference to FIG. 7, a bearing 700 having an out of round bearing cage 750 engaged with an outer ring 620 is depicted in accordance with various embodiments. Out of round bearing cage 750 may comprise a first bearing cage surface 751 having an out of round shape. In various embodiments, a second bearing cage surface 752 may be circular relative to first bearing cage surface 751. In various embodiments, second bearing cage surface 752 may also comprise an out of round shape at least partially similar to first bearing cage surface 751.

Out of round bearing cage 750 may comprise a first bearing cage surface 751 having one or more valleys 757 and one or more peaks 755. Each valley 757 may define a portion of first bearing cage surface 751 that extends further radially inward relative to a radial centerpoint 701, in comparison to a standard circular shape. Each peak 755 may define a portion of first bearing cage surface 751 that extends further radially outward relative to radial centerpoint 701, in comparison to a standard circular shape. Each peak 755 may define a pinch point relative to second outer ring surface 622 of outer ring 620. For example, each peak 755 may be distanced from second outer ring surface 622 at a first distance d1. Each valley 757 may be separated from second outer ring surface 622 at a second distance d2. Second distance d2 may be greater than first distance d1. Out of round bearing cage 750 may comprise any suitable and/or desired number of peaks 755, valleys 757, and/or corresponding pinch points. For example, first bearing cage surface 751 may comprise between 2 peaks to 10 peaks 755, between 2 valleys to 10 valleys 757, and/or between 2 corresponding pinch points to 10 corresponding pinch points.

As a further example, and with reference to FIG. 8, a bearing 800 having an out of round outer ring 820 engaged with bearing cage 650 is depicted in accordance with various embodiments. Out of round outer ring 820 may comprise a second outer ring surface 822 having an out of round shape. In various embodiments, a first outer ring surface 821 may be circular relative to second outer ring surface 822. In various embodiments, first outer ring surface 821 may also comprise an out of round shape at least partially similar to second outer ring surface 822.

Out of round outer ring 820 may comprise a second outer ring surface 822 having one or more valleys 827 and one or more peaks 825. Each valley 827 may define a portion of second outer ring surface 822 that extends further radially inward relative to a radial centerpoint 801, in comparison to a standard circular shape. Each peak 825 may define a portion of second outer ring surface 822 that extends further radially outward relative to radial centerpoint 801, in comparison to a standard circular shape. Each valley 827 may define a pinch point relative to first bearing cage surface 651 of bearing cage 650. For example, each valley 827 may be distanced from first bearing cage surface 651 at a first distance d1. Each peak 825 may be distanced from first bearing cage surface 651 at a second distance d2. Second distance d2 may be greater than first distance d1. Second outer ring surface 822 may comprise any suitable and/or desired number of peaks 825, valleys 827, and corresponding pinch points. For example, out of round outer ring 820 may comprise second outer ring surface 822 having between 2 peaks to 10 peaks 825, between 2 valleys to 10 valleys 827, and/or between 2 corresponding pinch points to 10 corresponding pinch points.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bearing, comprising:
   an inner ring, comprising:
      a first inner ring surface radially opposite a second inner ring surface; and
      a forward shoulder and an aft shoulder extending radially from the first inner ring surface, wherein the forward shoulder and the aft shoulder are configured to engage a bearing element at opposite axially outer surfaces, and wherein the forward shoulder, the aft shoulder, and the first inner ring surface comprise an out of round shape having a peak and a valley relative to a radial centerpoint of the bearing; and
   a bearing cage having a first bearing cage surface radially opposite a second bearing cage surface, wherein the second bearing cage surface is configured to engage the forward shoulder and the aft shoulder of the inner ring.

2. The bearing of claim 1, wherein the first inner ring surface proximate the peak is a first distance from the second bearing cage surface and the first inner ring surface proximate the valley is a second distance from the second bearing cage surface.

3. The bearing of claim 2, wherein the second distance is greater than the first distance.

4. The bearing of claim 1, wherein the peak comprises between 2 peaks to 10 peaks and the valley comprises between 2 valleys to 10 valleys.

5. The bearing of claim 1, further comprising a bearing element in contact with the first inner ring surface of the inner ring and surrounded by the bearing cage, and an outer ring in contact with the bearing element radially opposite the inner ring.

6. The bearing of claim 1, wherein the second bearing cage surface of the bearing cage comprises a second out of round shape having a second peak and a second valley relative to the radial centerpoint of the bearing.

7. A gas turbine engine comprising:
   a shaft;
   a nonflexible inner bearing ring coupled to the shaft;
   a plurality of bearing elements in contact with a first inner ring surface of the nonflexible inner bearing ring;
   a nonflexible outer bearing ring surrounding the nonflexible inner bearing ring and the bearing elements, wherein the shaft and the nonflexible inner bearing ring are configured to rotate within the nonflexible outer bearing ring; and
   a bearing cage having a first bearing cage surface radially opposite a second bearing cage surface, wherein the bearing cage is configured to surround the bearing elements and engage with at least one of the nonflexible inner bearing ring or the nonflexible outer bearing ring, and wherein at least one of the first inner ring surface or a second outer ring surface of the nonflexible outer bearing ring comprise an out of round shape having a peak and a valley relative to a radial centerpoint defined between the nonflexible inner bearing ring and the nonflexible outer bearing ring.

8. The gas turbine engine of claim 7, wherein in response to the bearing cage engaging the nonflexible inner bearing ring and the first inner ring surface being out of round, the first inner ring surface proximate the peak is a first distance from the second bearing cage surface and the first inner ring surface proximate the valley is a second distance from the second bearing cage surface.

9. The gas turbine engine of claim 7, wherein in response to the bearing cage engaging the nonflexible outer bearing ring and the second outer ring surface being out of round, the second outer ring surface proximate the valley is a first distance from the first bearing cage surface and the second outer ring surface proximate the peak is a second distance from the first bearing cage surface.

10. The gas turbine engine of claim 7, wherein the peak comprises between 2 peaks to 10 peaks and the valley comprises between 2 valleys to 10 valleys.

11. The gas turbine engine of claim 7, wherein the first bearing cage surface of the bearing cage comprises a second out of round shape having a second peak and a second valley relative to the radial centerpoint.

12. The gas turbine engine of claim 11, wherein the second bearing cage surface of the bearing cage comprises a third out of round shape having a third peak and a third valley relative to the radial centerpoint.

13. A bearing, comprising:
   an outer ring, comprising:
      a first outer ring surface radially opposite a second outer ring surface; and
      a forward shoulder and an aft shoulder extending radially from the second outer ring surface, wherein the forward shoulder and the aft shoulder are configured to engage a bearing element at opposite axially outer surfaces, and wherein the forward shoulder, the aft shoulder, and the second outer ring surface comprise an out of round shape having a peak and a valley relative to a radial centerpoint of the bearing; and
   a bearing cage having a first bearing cage surface radially opposite a second bearing cage surface, wherein the first bearing cage surface is configured to engage with the second outer ring surface.

14. The bearing of claim 13, wherein the second outer ring surface proximate the valley is a first distance from the first bearing cage surface and the second outer ring surface proximate the peak is a second distance from the first bearing cage surface.

15. The bearing of claim 14, wherein the second distance is greater than the first distance.

16. The bearing of claim 13, wherein the peak comprises between 2 peaks to 10 peaks and the valley comprises between 2 valleys to 10 valleys.

17. The bearing of claim 13, further comprising a bearing element in contact with the second outer ring surface of the outer ring and surrounded by the bearing cage, and an inner ring in contact with the bearing element radially opposite the outer ring.

18. The bearing of claim 13, wherein the first bearing cage surface comprises a second out of round shape having a second peak and a second valley relative to the radial centerpoint of the bearing.

\* \* \* \* \*